United States Patent [19]

Burget et al.

[11] Patent Number: 4,543,117
[45] Date of Patent: Sep. 24, 1985

[54] METHOD FOR PRODUCING MOLTEN GLASS

[75] Inventors: Paul Burget, Welkenraedt, Belgium; Michel Zortea, Chalon sur Saone, France

[73] Assignee: Saint-Gobain Vitrage, Aubervilliers, France

[21] Appl. No.: 530,029

[22] Filed: Sep. 7, 1983

Related U.S. Application Data

[63] Continuation of Ser. No. 241,093, Mar. 6, 1981, abandoned.

[30] Foreign Application Priority Data

Mar. 11, 1980 [FR] France .................................. 80 05405

[51] Int. Cl.$^4$ ............................. C03B 5/18; C03B 5/04
[52] U.S. Cl. ......................................... 65/135; 65/134; 65/178
[58] Field of Search ................. 65/134, 135, 178, 179, 65/347; 366/349, 336

[56] References Cited

U.S. PATENT DOCUMENTS

| | | | |
|---|---|---|---|
| 2,493,260 | 1/1950 | Paquette et al. | 65/178 X |
| 3,108,149 | 10/1963 | Carney et al. | 65/135 X |
| 3,208,841 | 9/1965 | Burch | 65/179 |
| 3,330,639 | 7/1967 | Boettner | 65/347 X |
| 3,420,653 | 1/1969 | Boettner | 65/347 X |
| 3,986,957 | 10/1976 | Wilkes | 366/336 X |
| 3,989,497 | 11/1976 | Dickinson et al. | 65/178 X |
| 4,029,488 | 6/1977 | Rhett | 65/135 X |
| 4,047,918 | 9/1977 | Heithoff | 65/179 |
| 4,317,669 | 3/1982 | Boss et al. | 65/135 |

FOREIGN PATENT DOCUMENTS

| | | | |
|---|---|---|---|
| 54-128863 | 10/1979 | Japan | 366/336 |
| 624946 | 7/1947 | United Kingdom . | |
| 1490426 | 2/1975 | United Kingdom . | |

*Primary Examiner*—Kenneth M. Schor
*Attorney, Agent, or Firm*—Pennie & Edmonds

[57] ABSTRACT

The invention relates to a method for producing molten glass in a melting furnace 1 equipped with a tank containing a glass bath 3, where the ingredients of the glass are melted in a refining zone 10 and the molten glass flows into an adjacent conditioning zone 13.

According to the invention, the current is driven to a passage 31, which is located at the common boundary of the refining zone 10 and the conditioning one 13, this boundary or corset has a narrower width than that of the current, and the current is forced to go through the passage 31.

Thus the homogeneity of the glass is increased at drawing off.

4 Claims, 9 Drawing Figures

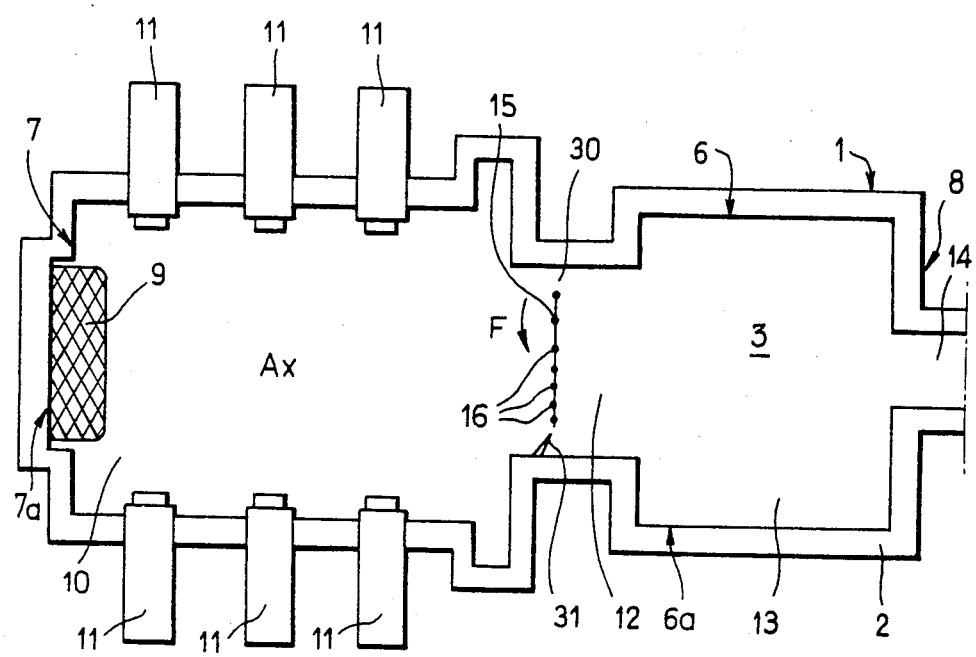
FIG_1
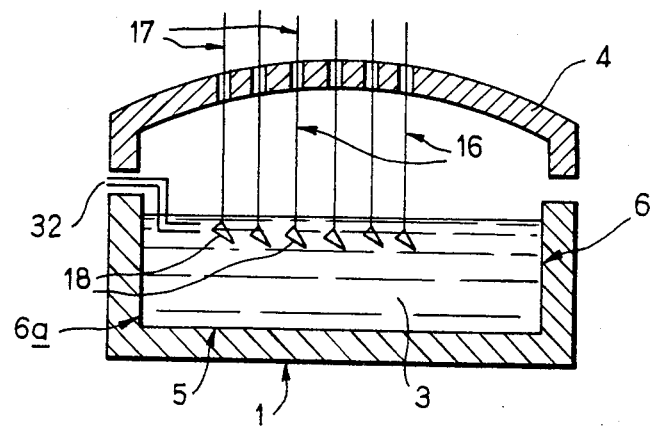
FIG_2

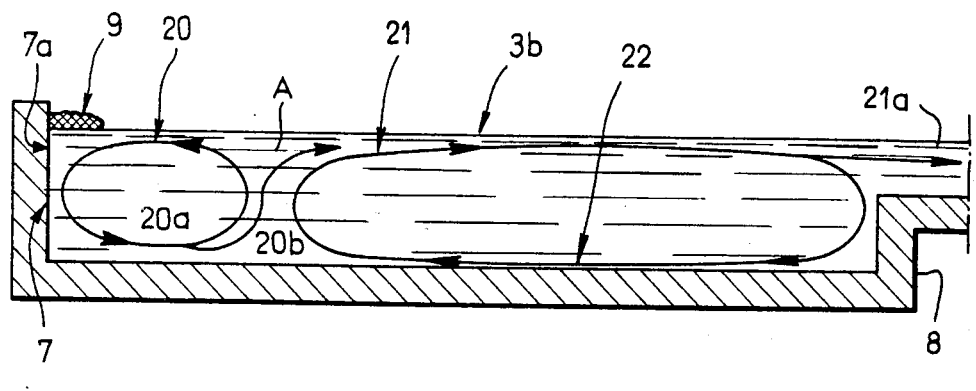
FIG_3
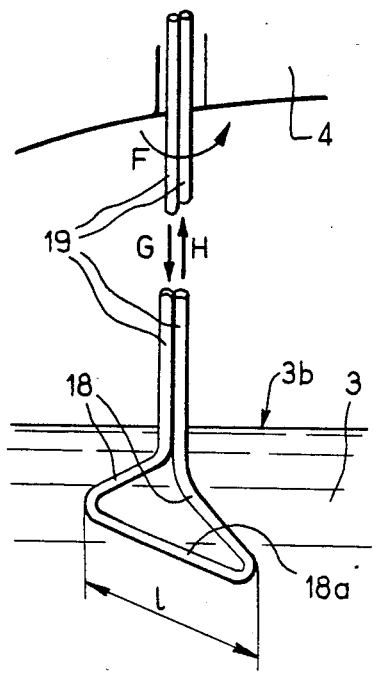
FIG_4

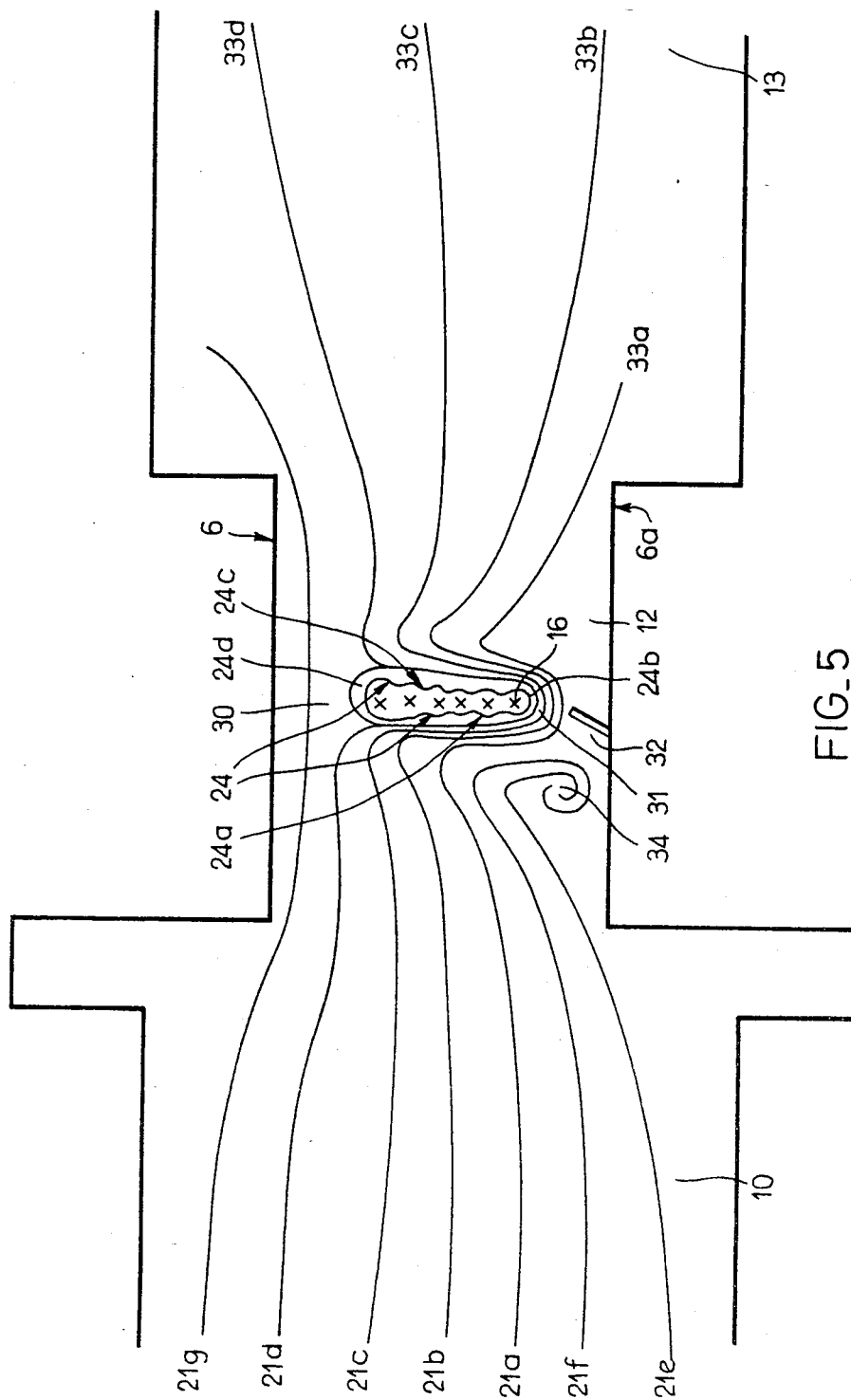
FIG_5

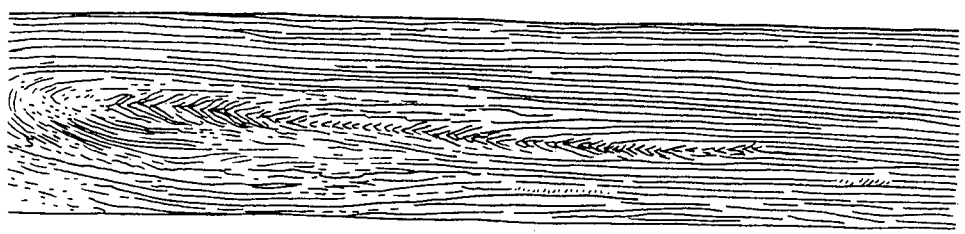
FIG_6
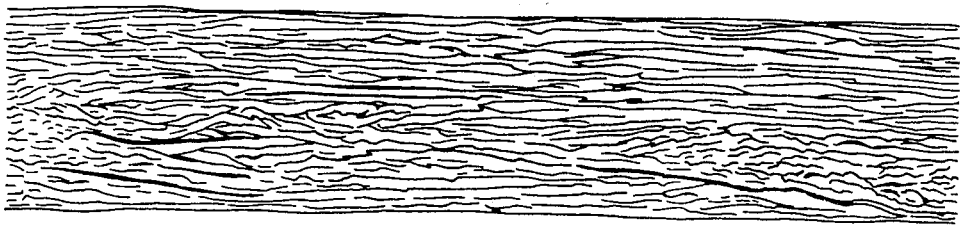
FIG_7
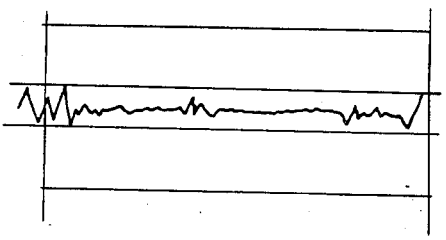
FIG_8
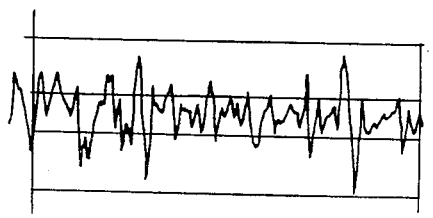
FIG_9

METHOD FOR PRODUCING MOLTEN GLASS

This is a continuation, of application Ser. No. 241,093 filed Mar. 6, 1981, and now abandoned.

TECHNICAL FIELD

This invention relates to a process for producing homogeneous molten glass. More particularly, this invention relates to a process of for creating and controlling turbulence in the refining and conditioning zones of a melting furnace whereby homogeneous molten glass is produced.

BACKGROUND ART

As is known in the glass making art, a melting furnace, made up of an elongated tank topped by a crown, essentially comprises two parts: a refining zone maintained at a high temperature; and, a conditioning zone maintained at a lower temperature, also called a braising zone. In modern furnaces, the refining and conditioning zones are joined by a narrow section called a corset. Raw materials forming the vitrifiable composition are introduced upstream of the refining zone through a charging hole. These raw materials are melted by heating devices such as burners. The molten glass then flows downstream, through the corset, to the conditioning zone, where it is brought to a suitable temperature, to be taken off by drawing for further operations of shaping, drawing, and floating or, more generally, fashioning. To provide the necessary regulation of the glass temperature the conditioning zone may also be provided with cooling devices in addition to the heating devices.

It is not enough, however, merely to bring the glass, which is to be removed for fashioning, to the desired temperature; this glass must also be homogeneous. However, the conditions within a conventional furnace tend to prevent homogeniety. Certain well defined currents are formed in the various regions of the furnace because of differences in temperature and the drawing off of the glass. While these currents do create some mixing, they are localized. The most notable of these currents is a forward current usually located immediately in the upper part of the molten glass bath which flows from the refining zone to the conditioning zone. Meanwhile a return current, located under the forward current, flows in the opposite direction. The combination of these currents, however, is not always sufficient to produce a homogeneous glass. In a given sample of glass, taken at the furnace output, it is possible for the sample to contain masses of glass which have resided in the furnace for periods ranging from several dozen hours to as much as several weeks.

An effort has been made to remedy this drawback by placing in the molten glass bath mechanical or thermal barriers to force the glass currents through passages in the depth of the glass bath, thus causing an increased mixing. It has also been proposed to separate physically two distinct zones of the glass bath by means of floating barriers. These floating barriers are placed along the width of the tank and their function is either to cause a mixing of the bath or to divide the furnace into two successive zones.

It has also been proposed to block only the median part of the molten glass bath by a barrier occupying only a part of the width and height of the bath. This barrier—placed between the refining zone and the conditioning zone and, in particular, in the corset when the furnace includes one—makes it possible to divert the central current of recently formed glass which, in the absence of the barrier, would be the primary source of glass being drawn off from the furnace.

DISCLOSURE OF THE INVENTION

We have found that the action of the barriers, if it leads to a better selection of glass to be drawn off, still does not create an effective mixing of the glass. An increase in the specific rate of drawing off the furnaces, for economic reasons, no longer makes it possible to be satisfied with the selection of glass. We have found that an additional action of mixing the veins of glass of various ages is required. For colored or special glasses, this mixing action is even more necessary because it permits more glass to be drawn off the furnace in a given time without reducing the quality of the glass.

The present invention provides a process which makes it possible to increase the mixing of molten glass in melting furnaces, with the consequence of a better homogeneity of the glass at drawing off and which also make possible an increase in the specific rate of drawing off without the quality of the glass being altered.

For the purpose of increasing the mixing of the molten glass, the invention has as its object a process for producing molten glass in a melting furnace. The melting furnace is equipped with a tank containing a glass bath, where the ingredients of the glass are melted in a melting-refining zone. The molten glass then proceeds to an adjacent conditioning zone from which it may be drawn off or removed for forming into a product. This general motion of the molten glass produces a forward current of molten glass, located in the upper surface of the refining zone and flowing from the melting zone to the conditioning zone, and a counter current of molten glass located below the forward current and flowing in the opposite direction. This process is characterized in that: the forward current is driven to a passage that is located at the common boundary of the refining and conditioning zones close to a side of the tank. The common boundary, of the refining and conditioning zones, or corset, has a narrower width than that of the current. Accordingly, the forward current is forced to flow through the narrowed passage, downstream from which the current may resume its initial spread.

In one mode for utilizing this process, the forward current is retarded over a predetermined portion of its initial path and is forced to flow through a passage narrower than its initial route. After this passage, the forward current may again spread out and resume its initial distribution.

Advantageously, the restricted passage through which the forward current is forced to flow has a width ranging from about 1% to about 3% of the width of the refining or conditioning zone.

Preferably, a vein of the forward current is made to flow in the vicinity of the side of the tank opposite the location of the restricted passage, particularly over a width between about 1/12 to about ⅓ of the width of the refining or conditioning zone.

The invention also provides a glass furnace which operates according to this process. The furnace is characterized in that it comprises an array, preferably a row, of agitators which are immersed in the molten glass bath in a transverse alignment separating the refining zone from the conditioning zone. Each agitator is suspended from the furnace and is adapted to be rotated by suitable driving means. In a preferred embodiment the agitators all rotate in the same direction. A passage is formed between each end of this alignment and the corresponding wall of the edge of the tank, and at least one passage has a width smaller than the other passages.

The passage of narrower width can be limited by the wall of the tank or by a barrier means, for example, by a plate of refractory material or by a cooled pin.

BRIEF DESCRIPTION OF THE DRAWINGS

The accompanying diagrammatic drawings illustrate the invention. In these drawings:

FIG. 1 is a plan view of a furnace according to the invention.

FIG. 2 is a cross section of this furnace at the corset, with the agitators seen in perspective.

FIG. 3 is a longitudinal section of the furnace showing the movement of the molten glass in the refining and conditioning zones.

FIG. 4 is a perspective view of an agitator.

FIG. 5 shows the movements imparted to the molten glass current by the agitators at the corset of the tank.

FIGS. 6 and 7 are two striograms of a glass prepared, respectively, in a melting furnace according to the invention and in a standard furnace.

FIGS. 8 and 9 are diagrams showing the variations of the index of refraction of a glass plate made, respectively, in a furnace according to the invention and in a standard furnace.

BEST MODE FOR CARRYING OUT THE INVENTION

Reference is made first to FIGS. 1 and 2, which show a melting furnace 1, comprising an elongated bath 2 containing a molten bath 3 and a crown 4, topping the tank and extending beyond it, the crown and tank consisting of suitable refractory materials. This tank comprises a bottom 5, side walls 6, 6a and end walls, upstream 7 and downstream 8, respectively.

The vitrifiable composition (groups of ingredients of the glass) is poured, by a suitable device not shown, into a charging hole or other charging means 7a, located at the upstream end 7 of tank 2. This composition, first spread in layer 9 at the upper surface of the bath, is melted, then refined in the refining zone or other refining means 10 at a high temperature; the refining means is provided with heating means, for example burners 11. The refined glass then flows through a narrowed passage 12 called a corset to a conditioning zone or other conditioning means 13, also called a braising zone, where the temperature of the glass is homogenized and lowered to a suitable value. The glass is then removed for the further operations of molding, drawing, floating or, more generally, finished shaping, by a channel 14 communicating with the downstream end wall 8 of furnace 1.

By placing burners 11 as indicated diagrammatically in FIG. 1, there is created a hot point A (FIGS. 1 and 3) located in the refining zone and known to glass technicians as the source point. On opposite sides of this point A, are established two convection currents. The first convection current 20, directed on the surface of the molten glass toward upstream end wall 7 of the furnace and toward charging hole 7a, has the effect of activating the melting of lumps of composition 9. This melting action causes cooling of this current, which goes down in the bath and is directed on the floor of the refining zone (current 20a of FIG. 3) toward point A, being heated to reform current 20. Excess part 20b of this current is transferred downstream from point A, where it is joined with the second current coming from point A (current 21), then is directed on the surface toward downstream end wall 8 of the furnace, where drawing 21a occurs, while the rest of the molten glass forms return current 22 directed on the floor toward point A.

Agitators 16, suspended by their upper end 17 from crown 4 (FIG. 2) while their lower end 18 goes down into current 21 of the molten glass bath, are placed in corset 12, transverse to the tank and direction of flow of the forward current, along a line 15, with two free passages, 30 and 31 respectively, at each of the ends of the row (FIG. 1) between the edges of the tank and agitators.

These agitators, driven rotationally in the same direction around their upper end 17 (arrow F) by suitable means not shown, are, for example, made up of a pipe 19 (FIG. 4) preferably of steel, bent on itself at the upper end of the agitators, and are able to be supplied with cooling water (arrows G and H). At lower end 18 of the agitators, pipe 19 exhibits a loop 18a comprising a segment of length 1 in the horizontal plane.

The best mode functioning of this device is as follows:

To begin with, the agitators are driven at progressively increasing speeds. At a predetermined speed, these agitators create, in the molten glass, a continuous current 24 (FIG. 5) opposing direct passage of the molten glass. The existence of such continuous current 24 can be proven by a current indicator, for example, a graphite disk (not shown). This graphite disk, placed on the glass in the refining zone, describes a closed curve by traveling successively on side 24a located opposite the refining zone 10, on an end part 24b of the surface of the driving current, on side 24c located opposite the conditioning zone and on the other end part 24d of the surface of the driving current.

Two free passages are thus reserved for the glass, of which one 30 is located between end part 24d of the surface of the driving current and side wall 6 of the tank, the other, 31, is more narrow than passage 30, and is located between end part 24b of the surface of the driving current and side wall 6a of the tank. Passage 31 can advantageously be restricted by a barrier 32 which limits corrosion of the corresponding wall of the furnace. This barrier 32 can be formed, for example, of a cooled pin (FIG. 2) or a plate of refractory material (FIG. 5). Its action in depth is limited to current 24.

It is possible to use agitators 16 that are all identical and arrange their row 15 dissymmetrically in the tank, these agitators all turn at approximately identical speeds.

Alternately, while insuring the fluid-tightness of the barrier, it is possible to regulate the speed of the agitators, for example, of agitator 16 closest to the end section 24b so as to increase the driving effect in the passage 31.

As can be seen in FIG. 5, central streams 21a, b, c and d of the forward current are driven in the direction of the movement of surface 24. The glass of streams 21a, b, c and d goes through narrowed passage 31 and then spreads out in the conditioning zone according to an arrangement whose central part 33b, c and d keeps the same relative position as they had upstream from passage 31.

End streams 21e and f of the forward current located on the side of narrow passage 31 wind around, forming a vortex 34, and are consequently entrained by return current 22. The other end streams of the forward current, located on the side of wide passage 30, for example 21g, clear this passage. These streams serve to stabilize and recenter streams 33b, c and d, and isolate the barrier of wall 6 thus avoiding increased wear from the refractories.

However, it will be noted that only streams 33b, c and d are used as the supply stream to be drawn off as feed material for the shaping machines. The other streams 21g, 33a and 21e and f (as mentioned above for these streams 21e and f) are entrained by return current 22 and do not participate in production directly.

The supply stream is therefore made up only of glass that has undergone a very thorough rolling between edge 6a of the tank, or barrier 32, and end part 24b of the driving zone. Preferably, there is actually given to narrow passage 31 a width between about 1% and about 3% of the width of the refining or conditioning zones and the width of the tank at the site where the agitators are located has a width between about 1/12 to about ⅓ of the width of the refining or conditioning zones. The width of side passages 30 and 31 should, moreover, be able to be adjusted as a function of the speed of the glass in the driving zone and the width of the zone for drawing off.

The rolling of the glass in narrow passage 31 has the effect of increasing heterogeneity which facilitates chemical diffusion. Consequently, homogenization progresses rapidly, especially if the glass is at a temperature equal to or greater than 1300° C.

To demonstrate the good quality of the resulting glass, striograms have been made for plate glass obtained from the same furnace equipped with and without agitators. See FIGS. 6 and 7, respectively. It can be seen that the striographic picture of the plate glass is much more regular when the agitators are used than in the case when they are absent.

To obtain more demonstrative results, the variations in the index of refraction on a section of glass one millimeter thick, cut perpendicularly to the direction of drawing the plate glass, have been plotted point by point. It has been found that the variations in the index of refraction are much less strong when agitators are used (FIG. 8) than when they are not used (FIG. 9).

The agitators used, twelve in number, were spaced 300 mm from one another and comprised a part 18a of a length 1 (FIG. 4) equal to 340 millimeters. They descended 200 millimeters in the glass bath which had a depth on the order of one meter. These agitators were driven at a rotational speed of about 22 rpm for a glass production on the order of 600 tons/day.

The invention has been described in its application to a furnace with a rectangular tank provided with a corset, but the process and device according to the invention can, of course, be applied to any other shape of furnace.

We claim:

1. A method for making molten glass in a melting furnace from a vitrifiable composition comprising:
    (a) feeding the vitrifiable composition through a charging hole into a refining zone of the melting furnace, said refining zone equipped with a heating means for melting the vitrifiable composition;
    (b) melting the vitrifiable composition in the refining zone to form a molton glass having a forward current and a countercurrent, said forward current flowing away from the charging hole on an upper surface of said molten glass and said countercurrent flowing beneath said forward current toward the charging hole;
    (c) restricting the flow of said molten glass forward current by means of a corset interposed between said refining zone and a conditioning zone of said melting furnace, said corset having a plurality of agitating means for creating a continuous current in said molten glass and for opposing direct passage of said molten glass from said refining zone to said conditioning zone, where said agitating means define a narrow flow passage for said molten glass at the first side of the corset and a wide flow passage for said molten glass at the second side of the corset, and where said narrow passage is substantially narrower than said wide passage;
    (d) operating said agitating means in such a manner that they will direct forward current of said molten glass by means of said agitating means toward said narrow passage;
    (e) passing central streams of said molten glass forward current from said refining zone by action of said agitating means to said narrow passage and then to said conditioning zone;
    (f) passing a second-side end stream of said molten glass forward current from said refining zone through said wide passage to said conditioning zone;
    (g) conditioning said molten glass in said conditioning zone; and
    (h) recovering said conditioned molten glass.

2. A method according to claim 1 wherein the narrow passage has a width between 1% and 3% of a width of the refining zone or the conditioning zone.

3. The process as in claim 1, wherein a site where the agitiator means are located has a width between 1/12 and ⅓ of a width of the refining zone or the conditioning zone.

4. The process as in claim 1, wherein the narrow passage and the wide passage have a width that can be adjusted as a function of conditioned molten glass being recovered.

* * * * *

UNITED STATES PATENT AND TRADEMARK OFFICE
CERTIFICATE OF CORRECTION

PATENT NO. : 4,543,117
DATED : September 24, 1985
INVENTOR(S) : Paul Burget et al.

It is certified that error appears in the above-identified patent and that said Letters Patent is hereby corrected as shown below:

Column 6, line 45, "A method" should be --The method--.

Column 6, line 48, "The process as in" should be --The method according to--.

Column 6, line 52, "The process as in" should be --The method according to--.

Signed and Sealed this

Twenty-fourth Day of December 1985

[SEAL]

Attest:

Attesting Officer

DONALD J. QUIGG

Commissioner of Patents and Trademarks